(12) United States Patent
Peterson et al.

(10) Patent No.: US 11,214,393 B2
(45) Date of Patent: Jan. 4, 2022

(54) NET KNIFE ASSEMBLY

(71) Applicant: CNH Industrial America, LLC, New Holland, PA (US)

(72) Inventors: Charles Brandon Peterson, West Grove, PA (US); Scott C. Simmons, Lititz, PA (US)

(73) Assignee: CNH Industrial America, LLC, New Holland, PA (US)

( * ) Notice: Subject to any disclaimer, the term of this patent is extended or adjusted under 35 U.S.C. 154(b) by 592 days.

(21) Appl. No.: 15/588,654

(22) Filed: May 7, 2017

(65) Prior Publication Data
US 2018/0317393 A1     Nov. 8, 2018

(51) Int. Cl.
*B65B 11/04*     (2006.01)
*A01F 15/07*     (2006.01)

(52) U.S. Cl.
CPC .......... *B65B 11/04* (2013.01); *A01F 15/0715* (2013.01)

(58) Field of Classification Search
CPC ............... A01F 15/071; A01F 15/0715; B65B 11/04–045; B65B 41/12; B65B 41/16; B26D 1/385; B26D 1/38; B26D 1/345
USPC ......... 53/116, 118, 587, 389.3; 83/673, 675, 83/601–604
See application file for complete search history.

(56) References Cited

U.S. PATENT DOCUMENTS

| | | | | |
|---|---|---|---|---|
| 3,474,696 A | * | 10/1969 | Rosenburgh ........... | B26D 1/385 83/585 |
| 3,865,156 A | * | 2/1975 | Moody ................. | B65B 13/027 140/123.6 |
| 4,131,044 A | * | 12/1978 | Cassia ..................... | B26D 5/26 83/205 |
| 4,213,363 A | * | 7/1980 | Granger ................. | B26D 1/425 83/298 |
| 4,230,010 A | * | 10/1980 | Guenthner ................ | C03B 7/10 83/600 |

(Continued)

FOREIGN PATENT DOCUMENTS

EP     809930 A1     12/1997

OTHER PUBLICATIONS

SLOT, dictionary entry retrieved from URL https://www.merriam-webster.com/dictionary/slot on Mar. 2, 2020 (Year: 2020).*

(Continued)

*Primary Examiner* — Hemant Desai
*Assistant Examiner* — Valentin Neacsu
(74) *Attorney, Agent, or Firm* — Patrick Sheldrake; Peter Zacharias

(57) ABSTRACT

A net knife assembly for a baler is provided. The net knife assembly includes a linkage drive system including a drive linkage coupled to a motor. The net knife assembly includes a knife carrier coupled to the linkage drive system and configured to be positioned in a home position and a cut position. The net knife assembly includes a tensioning member coupled to the linkage drive system. The motor is configured to rotate the drive linkage of the linkage drive system, rotation of the drive linkage rotating the knife carrier between the home position and the cut position. Upon rotation of the knife carrier through a center position relative to the tensioning member, the tensioning member accelerates rotation of the knife carrier into the home position or the cut position.

13 Claims, 14 Drawing Sheets

(56) References Cited

U.S. PATENT DOCUMENTS

| | | | |
|---|---|---|---|
| 4,526,076 A * | 7/1985 | Hogan | B23D 17/08 |
| | | | 30/187 |
| 4,896,477 A | 1/1990 | Wagstaff et al. | |
| 4,995,216 A | 2/1991 | Vansteelan | |
| 5,581,973 A | 12/1996 | Underhill | |
| 5,581,976 A * | 12/1996 | Underhill | A01F 15/0715 |
| | | | 53/399 |
| 5,769,133 A * | 6/1998 | Dyer | B65B 13/027 |
| | | | 140/123.6 |
| 6,185,900 B1 * | 2/2001 | Martin | B65B 11/045 |
| | | | 53/118 |
| 6,295,797 B1 | 10/2001 | Naaktgeboren et al. | |
| 6,347,896 B1 * | 2/2002 | Robinson | B26D 1/305 |
| | | | 400/613 |
| 6,644,006 B1 | 11/2003 | Merritt et al. | |
| 6,688,092 B2 | 2/2004 | Anstey et al. | |
| 6,877,304 B1 | 4/2005 | Smith et al. | |
| 6,928,792 B1 * | 8/2005 | Viesselmann | A01F 15/0715 |
| | | | 220/557 |
| 7,784,400 B2 | 8/2010 | Simmons | |
| 8,601,770 B2 * | 12/2013 | Paillet | A01F 15/0715 |
| | | | 53/211 |
| 8,656,686 B2 * | 2/2014 | Smith | A01F 15/0715 |
| | | | 493/370 |
| 9,415,888 B2 | 8/2016 | Smith et al. | |
| 2007/0157556 A1 * | 7/2007 | Feraboli | A01F 15/0715 |
| | | | 53/399 |
| 2014/0260090 A1 * | 9/2014 | Smith | B65B 27/125 |
| | | | 53/397 |
| 2016/0037726 A1 * | 2/2016 | Horner | F16D 49/10 |
| | | | 56/341 |
| 2017/0001747 A1 * | 1/2017 | Reijersen Van Buuren | |
| | | | B65B 11/04 |

OTHER PUBLICATIONS

Extended European Search Report for EP Application 18170661.5 dated Sep. 6, 2018 (6 pages).

* cited by examiner

NET KNIFE ASSEMBLY

BACKGROUND

For many years agricultural balers have been used to consolidate and package crop material so as to facilitate the storage and handling of the crop material for later use. Usually, a mower-conditioner cuts and conditions the crop material for windrow drying in the sun. When the cut crop material is properly dried, a baler, for example a round baler, travels along the windrows to pick up the crop material and form it into cylindrically-shaped round bales.

Pickups of the baler gather the cut and windrowed crop material from the ground and convey the cut crop material into a bale-forming chamber within the baler. A drive mechanism operates to activate the pickups, augers, and a rotor of the feed mechanism. A conventional baling chamber may include of a pair of opposing sidewalls with a series of belts that rotate and compress the crop material into a cylindrical shape.

When the bale has achieved a desired size and density, a wrapping system may wrap the bale to ensure that the bale maintains its shape and density. For example, a net may be used to wrap the bale of crop material. A cutting or severing mechanism may be used to cut the net once the bale has been wrapped. The wrapped bale may be ejected from the baler and onto the ground by, for example, raising a tailgate of the baler. The tailgate is then closed and the cycle repeated as necessary and desired to manage the field of cut crop material.

One of the critical features on a round baler net wrapping system is the knife. In order to produce an ideal round bale package, a uniform cut is desired across the entire width of the net. In addition to improving the appearance of the bale, a clean cut also reduces the risk of loose net ends being caught in moving parts of the baler. A high-speed impact cut in convention balers is generally desired to create a clean cut. For example, if the knife moves into the path of the net too slowly, a long ragged cut is generally produced. As a further example, if the knife contacts the net with too low of a force, the net generally will not cut due to the net being under tensioned.

Conventional balers generally include an electric motor to push the knife through the net. A high-speed impact method of cutting necessitates considerable energy be used to accelerate the knife bar to an acceptable cutting speed with the electric motor, and is also dependent on adequate net tension to achieve a uniform cut. In addition, for safety reasons, the knife should not have any stored energy in its rest position that could be triggered inadvertently. Conventional knife bar designs generally do not have sufficient speed or power to provide the desired clean cut of the net.

SUMMARY

Exemplary embodiments are directed to a net knife assembly for a harvester, such as a round or square baler, including a tensioning member that assists in positioning the knife carrier into the home position or the cut position. The exemplary net knife assembly uses a motor to initiate rotation of the knife carrier using a linkage drive system. Upon rotation of the knife carrier through a center position or plane of the tensioning member, the potential energy stored in the tensioning member accelerates rotation of the knife carrier into the home position or the cut position. Such acceleration from the tensioning member reduces the amount of energy or power needed from the electric motor, and ensures that sufficient force is applied to the net in the cut position to generate a clean cut. In some embodiments, the rotation is in a direction that opposes the direction of net or wrap travel.

In accordance with some embodiments of the present disclosure, an exemplary net knife assembly for a baler is provided. The net knife assembly includes a linkage drive system including a drive linkage coupled to a motor. The net knife assembly includes a knife carrier coupled to the linkage drive system and configured to be positioned in a home position and a cut position. The net knife assembly includes a tensioning member coupled to the linkage drive system. The motor is configured to rotate the drive linkage of the linkage drive system, rotation of the drive linkage rotating the knife carrier between the home position and the cut position. Upon rotation of the knife carrier through a center position relative to the tensioning member, the tensioning member accelerates rotation of the knife carrier into the home position or the cut position. In some embodiments, the knife assembly is linked by a linking member to a subframe or frame of the harvester, such that it is positioned sufficiently proximate to a baling chamber for net wrap material to be dispensed by adequate tension to wrap a bale forming or formed in a bale chamber. In some embodiments, the linking member or members are bolts, screws or other members capable of fastening the knife assembly to the subframe or frame of the harvester. In some embodiments, the knife assembly may be fastened to a movable element by one or a plurality of linking members, wherein such movable element is a movable rod or series of movable rods operably attached to the frame or subframe of the harvester, the rod or movable rods capable of operating in one or more dispensing and operating conditions. In said operating condition the movable member is extended at or substantially proximate to the baling chamber of the harvester such that the distance between the net knife assembly and the baling chamber is sufficient to allow dispensing, wrapping and cutting of net wrap material round a bale of crop material in a bale chamber.

In some embodiments, the motor is an electric motor. The linkage drive system includes a slotted linkage, a bearing linkage, and an attachment linkage. The drive linkage is slidably coupled to a slot of the slotted linkage. The bearing linkage is rotatably coupled to the slotted linkage. The attachment linkage is coupled to the knife carrier at a coupling point at one end and coupled to the tensioning member at an opposing end. The center position includes alignment of the coupling point between the attachment linkage and the knife carrier, a pivot point of the knife carrier, and an anchor of the tensioning member, along a plane.

Rotation of the knife carrier above the center position accelerates rotation of the knife carrier with the tensioning member into the cut position. Rotation of the knife carrier below the center position accelerates rotation of the knife carrier with the tensioning member into the home position. In some embodiments, one full rotation of the drive linkage in a single direction rotates the knife carrier from the home position to the cut position, and from the cut position to the home position. In some embodiments, the tensioning member accelerates rotation of the knife carrier into the home position or the cut position without assistance or without substantial assistance from the motor. The net knife assembly includes knife coupled to the knife carrier.

In accordance with embodiments of the present disclosure, an exemplary net wrapping system for a baler is provided. The net wrapping system includes a net dispensing assembly and a net knife assembly. The net dispensing assembly includes a supply roll holding a net material. The net dispensing assembly includes a duckbill for receiving the net material from the supply roll and feeding the net material into a bale chamber along a first direction of travel. The net dispensing assembly includes one or more bale chamber rolls proximate the bale chamber for receiving the net material from the duckbill.

The net knife assembly includes a linkage drive system including a drive linkage coupled to a motor. The net knife assembly includes a knife carrier coupled to the linkage drive system and configured to be positioned in a home position and a cut position. The net knife assembly includes a tensioning member coupled to the linkage drive system. The motor is configured to rotate the drive linkage of the linkage drive system, rotation of the drive linkage rotating the knife carrier between the home position and the cut position. Upon rotation of the knife carrier through a center position relative to the tensioning member, the tensioning member accelerates rotation of the knife carrier into the home position or the cut position.

In some embodiments, rotation of the knife carrier into the cut position is in a second direction of travel, the second direction of travel being opposite from the first direction of travel. The supply roll includes a cylindrical body extending transversely across the baler. The duckbill is configured to be moved between a home position and an insert position. The linkage drive system includes a slotted linkage, a bearing linkage, and an attachment linkage. The drive linkage is slidably coupled to a slot of the slotted linkage. The bearing linkage is rotatably coupled to the slotted linkage. The attachment linkage is coupled to the knife carrier at a coupling point at one end and coupled to the tensioning member at an opposing end. The center position includes alignment of the coupling point between the attachment linkage and the knife carrier, a pivot point of the knife carrier, and an anchor of the tensioning member, along a plane.

In accordance with embodiments of the present disclosure, an exemplary baler is provided. The baler includes a frame, an apron assembly disposed within the frame and configured to form a bale, and a net wrapping system. The net wrapping system includes a net dispensing assembly and a net knife assembly. The net dispensing assembly includes a supply roll holding a net material. The net dispensing assembly includes a duckbill for receiving the net material from the supply roll and feeding the net material into a bale chamber along a first direction of travel. The net dispensing assembly includes one or more bale chamber rolls proximate the bale chamber for receiving the net material from the duckbill.

The net knife assembly includes a linkage drive system including a drive linkage coupled to a motor. The net knife assembly includes a knife carrier coupled to the linkage drive system and configured to be positioned in a home position and a cut position. The net knife assembly includes a tensioning member coupled to the linkage drive system. The motor is configured to rotate the drive linkage of the linkage drive system, rotation of the drive linkage rotating the knife carrier between the home position and the cut position. Upon rotation of the knife carrier through a center position relative to the tensioning member, the tensioning member accelerates rotation of the knife carrier into the home position or the cut position.

The linkage drive system includes a slotted linkage, a bearing linkage, and an attachment linkage. The drive linkage is slidably coupled to a slot of the slotted linkage. The bearing linkage is rotatably coupled to the slotted linkage. The attachment linkage is coupled to the knife carrier at a coupling point at one end and coupled to the tensioning member at an opposing end.

In accordance with embodiments of the present disclosure, an exemplary method of operating a net knife assembly for a baler is provided. The method includes actuating motor to rotate a drive linkage of a linkage drive system. The method includes rotating a knife carrier coupled to the linkage drive system based on rotation of the drive linkage between a home position and a cut position. Upon rotation of the knife carrier through a center position relative to a tensioning member coupled to the linkage drive system, the method includes accelerating rotation of the knife carrier into the home position or the cut position with the tensioning member. The method includes accelerating rotation of the knife carrier into the cut position after the knife carrier is rotated above the center position. The method includes accelerating rotation of the knife carrier into the home position after the knife carrier is rotated below the center position.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed net knife assemblies, reference is made to the accompanying figures, wherein.

DETAILED DESCRIPTION

Figure 1:
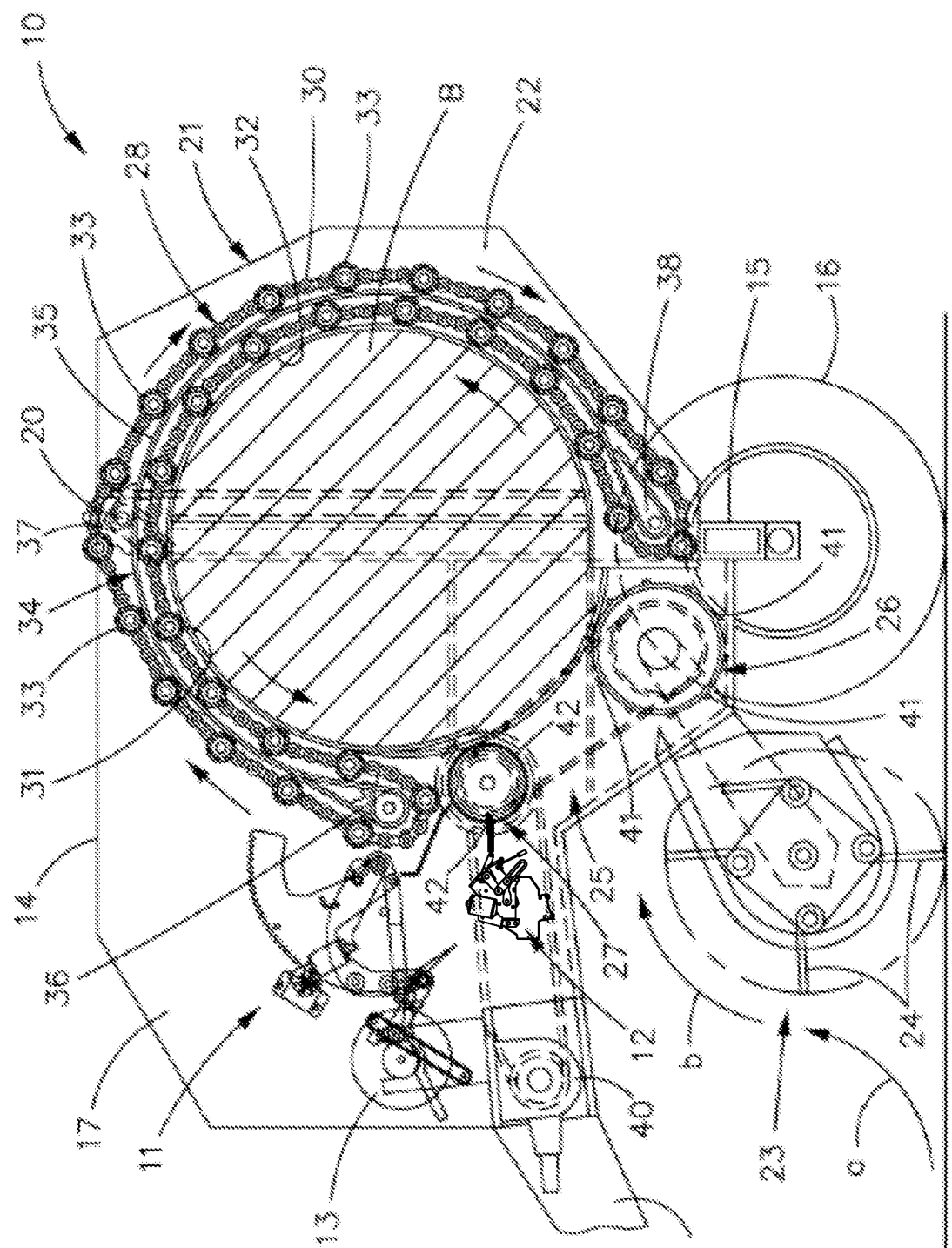
FIG. 1 is a cutaway side view of a round baler including an exemplary net knife assembly of the present disclosure.

It should be understood that the relative terminology used herein, such as "front", "rear", "left", "top", "bottom", "vertical", "horizontal", "up" and "down" is solely for the purposes of clarity and designation and is not intended to limit embodiments to a particular position and/or orientation. Accordingly, such relative terminology should not be construed to limit the scope of the present disclosure. In addition, it should be understood that the scope of the present disclosure is not limited to embodiments having specific dimensions. Thus, any dimensions provided herein are merely for an exemplary purpose and are not intended to limit the invention to embodiments having particular dimensions.

"Net material" as used herein is any material that is used in a baling mechanism for wrapping a bale of harvested crop material. In some embodiments, net material is netting, plastic or fabric enveloping, tying and/or binding the crop material. In some embodiments, the net material is netting dispensed by a net wrap from a position within the harvester at or substantially proximate to a baling chamber.

The disclosure relates to a harvester comprising at least one net knife assembly disclosed herein. In some embodiments, the harvester, is a square or round baler, cotton harvester, or combine comprising a baling mechanism.

In some embodiments, an exemplary net knife assembly includes an electric motor to arm and trip a linkage that allows the knife carrier to be driven by a spring to cut the net. The mechanical linkage also allows the spring tension to safely maintain the knife in the home position to eliminate the risk of unintended release of potential energy. In particular, to drive the knife with enough speed and force to cut the net cleanly, a spring is used to accelerate the knife carrier. The potential energy is stored in the spring in the arming cycle by the electric motor. For safety reasons, the linkage reverses the spring force and uses the stored energy from the spring in the armed position to pull the carrier into the rest stop. When the proper amount of net has been applied to the bale, the electric motor trips the linkage and allows the spring to freely drive the knife into the path of the net, producing a crisp, clean cut.

The exemplary net knife assembly has sufficient power to swing the knife into the path of the net, opposing the direction of net travel. The electric motor is used to store potential energy in the spring and therefore should be sized according to the spring. Using only the electric motor to re-arm the knife carrier allows the linkage to be designed at a ratio that allows for a slow motion of the motor, reducing the demand for motor power compared to the power applied by the spring. During the cutting motion, when the knife must move rapidly, the spring force is exerted for a short time. After the cutting motion, the knife has a significantly longer time to re-arm the knife while another bale is being formed, thereby reducing the necessary power output of the motor.

Embodiments of the present invention are particularly well suited, but in no way limited to, use with agricultural balers. The present invention may also find utility in use with round, square, or rectangular balers, for example, or any other baler used in the industry.

Agricultural balers, such as round balers, are well known in the agricultural industry, and the instant invention can be used with substantially any of such machines. Reference is made, for example, to U.S. Pat. Nos. 6,877,304; 6,688,092; 6,644,006 and 6,295,797 that illustrate such balers, the disclosure of which is incorporated herein by reference in their entirety. For illustrative purposes, details of an exemplary round baler in which the net knife assembly of the present disclosure may be used are disclosed in and will be described, in part, with reference to U.S. Pat. No. 5,581,976, which is also hereby incorporated by reference in its entirety.

FIG. 1 depicts an exemplary agricultural round baler, generally designated 10, in which embodiments of the net knife assembly of the present disclosure may be employed. As alluded to previously, the crop in the field is usually arranged in a windrow as it is engaged by the baler 10 being pulled along a windrow of cut crop material by a tractor (not shown). FIG. 1 shows a fixed chamber round baler 10 having a wrapping system for wrapping a cylindrical package of crop material (not shown) formed in a round baler 10. In particular, the wrapping system of baler 10 includes a net dispensing assembly 11 and a net knife or cutting assembly 12 for cutting web material, such as net, issued from a supply roll 13.

As shown in FIG. 1, round baler 10 includes a main frame 14 with a main support beam 15 on which a pair of wheels 16 (only one shown) are rotatably affixed. The main frame 14 includes a pair of side walls between which a cylindrical bale forming chamber extends. For the purposes of clarity, only one wall 17 is shown in FIG. 1 and the elements mounted inwardly thereof are shown in full lines for clarity. For illustrative purposes reference letter B is used to designate a bale, shown in cross section in the chamber.

Baler 10 includes a tongue 18 extending from the forward portion of main frame 14 for conventional connection to a tractor (not shown). Pivotally connected to the sidewalls of main frame 14 by a pair of stub shafts 20 is tailgate 21 which may be closed, as shown throughout the drawings, during bale formation or pivoted open about stub shafts 20 to discharge a completed bale. The tailgate includes tailgate walls 22 coextensive with side walls 17. A pickup assembly 23 mounted on main frame 14 in a suitable manner includes a plurality of fingers or tines 24 moveable in a predetermined path to lift crop material from the ground, generally depicted by direction arrow a, and deliver it rearwardly (arrow b) toward a transverse inlet 25 in the chamber defined by a floor roll 26 and a transverse stripper roll 27, both of which rolls are rotatably supported on mainframe 14 between sidewalls 17.

The bale forming chamber is defined primarily by an apron assembly 28 including a pair of support chains 30 mounted to travel along a continuous path, the inner run of which is defined on sidewalls 17 and tailgate walls 22 by front and rear sections 31, 32 of a continuous chain guide track that separates at a point of track adjacent the stub shaft 20 during bale discharge. The apron assembly 28 includes a plurality of parallel tubular crop engaging slats 33 extending between chains 30 to provide a cage-like periphery of the cylindrically shaped chamber. Radially outward of the inner run of apron assembly 28 are front and rear sections 34 of continuous cylindrical bale chamber wall. These sections, also separable during bale discharge, are mounted between side walls 17 and tailgate walls 22, respectively, for maintaining integrity between the outer and inner runs of chain 30.

Operatively engaged with chain 30 are drive sprocket 36 mounted between sidewalls 17, idler sprockets 37 also mounted between sidewalls 17 on shaft 20, and idler sprocket 38 mounted between tailgate walls 22. A conventional chain drive system for drive sprocket 36 is provided via appropriate coupling to gearbox 40 in a conventional manner, diagrammatically depicted in phantom outline outwardly of sidewall 17. The bale forming chamber is further defined by the outer conveying surfaces of floor roll 26 and stripper roll 27, both of which are driven in a direction opposite that of the bale chamber direction by conventional drive means appropriately coupled to gear box 40. In FIG. 1, floor roll 26 receives bale material at its forward surface, moving the bale material upward and rearward, clockwise as shown in FIG. 1. Bale material leaves the floor roll 26 and enters the bale chamber which rotates moving the bale material from a lower position, rearward and upward in a circular motion, counterclockwise as shown in FIG. 1. These rolls 26, 27 may be provided with ribs 41, 42 to enhance their ability to convey crop in the chamber as a bale is being formed. Other forms of aggressive surface structure may be used to accommodate various types of crops and conditions.

Figure 2:
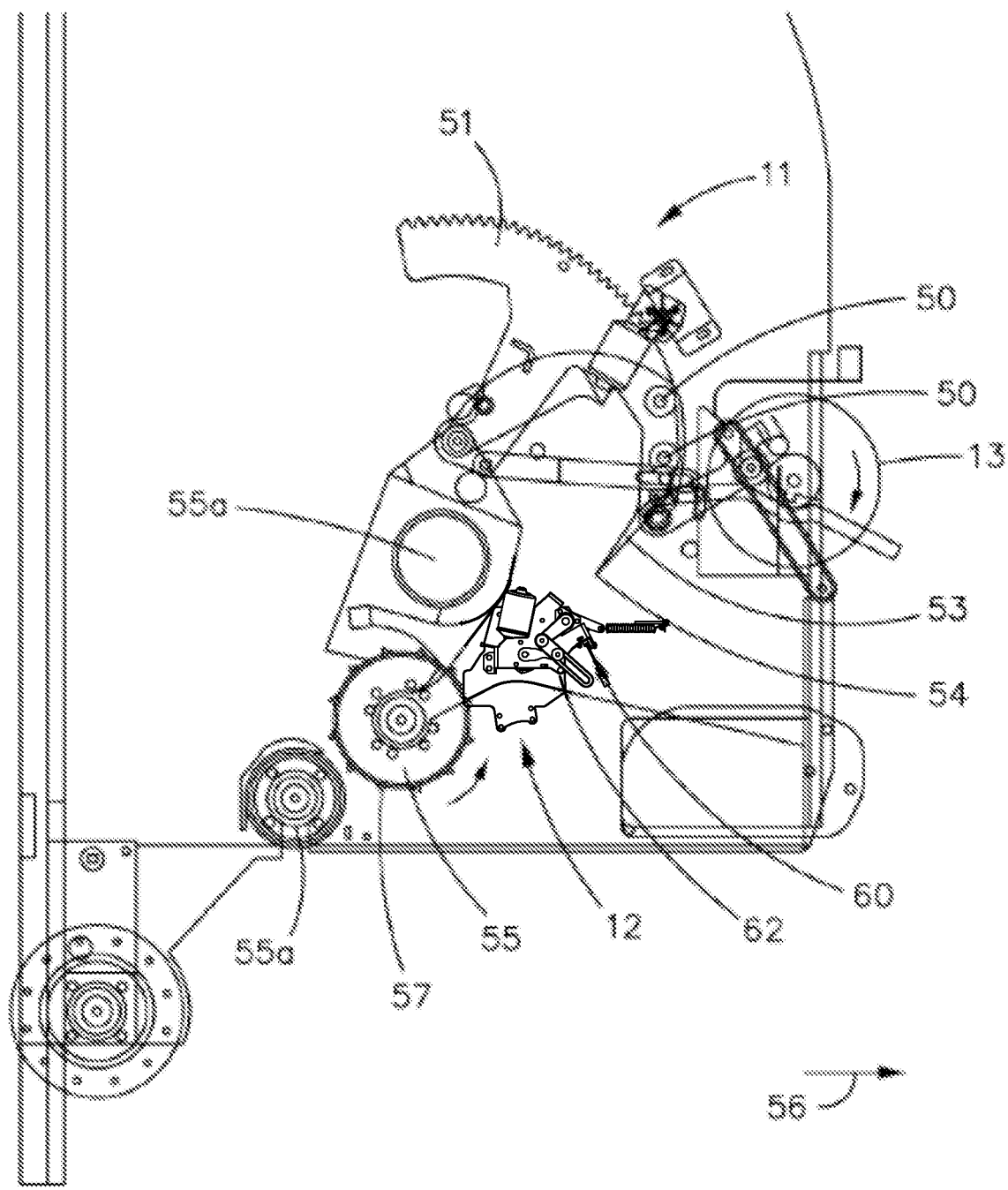
FIG. 2 is a cutaway side view of an exemplary wrapper system and net knife assembly of the present disclosure in a home position.
Figure 3:
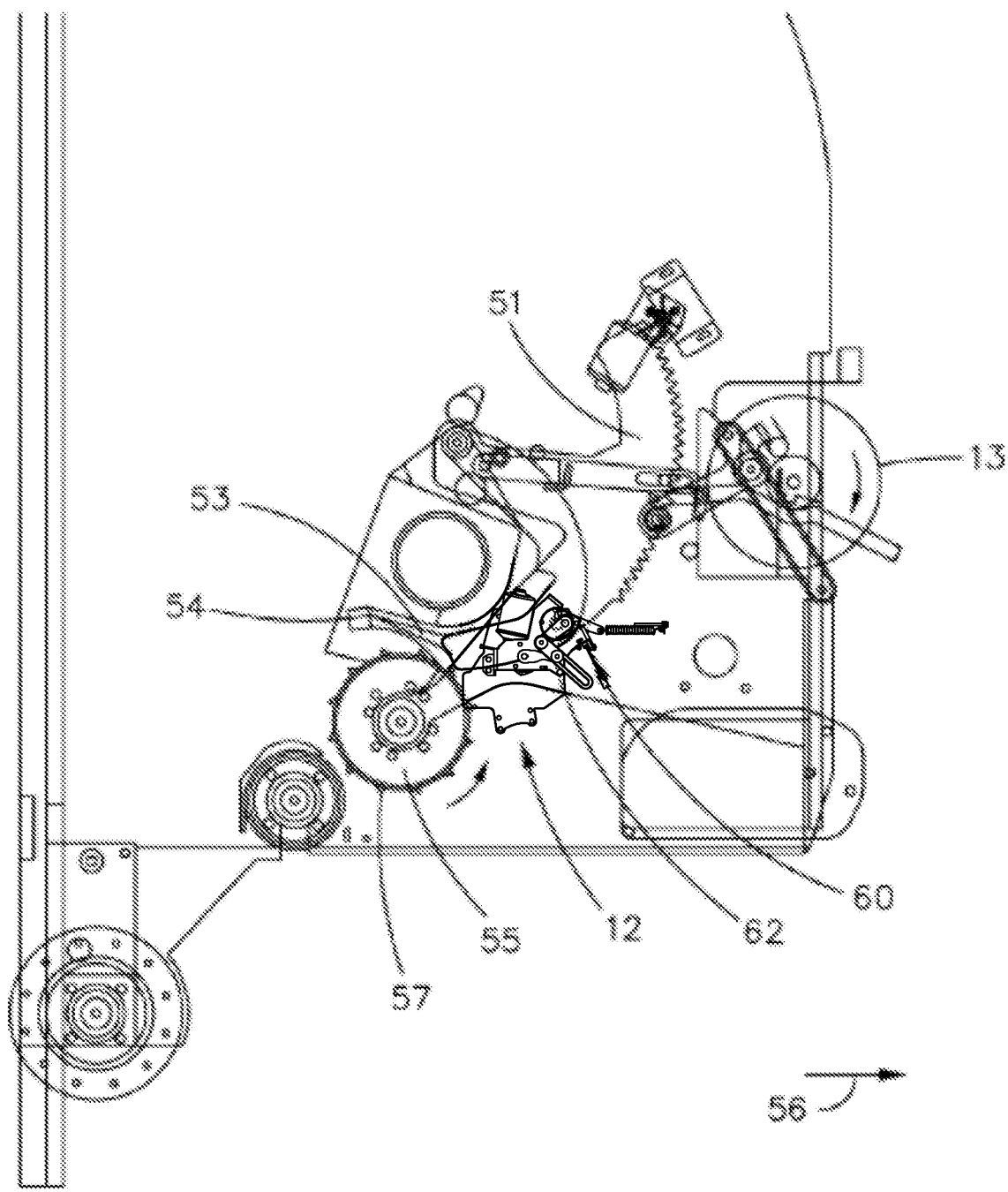
FIG. 3 is a cutaway side view of an exemplary wrapper system with a duckbill in an inserted position and a net knife assembly in a home position.
Figure 4:
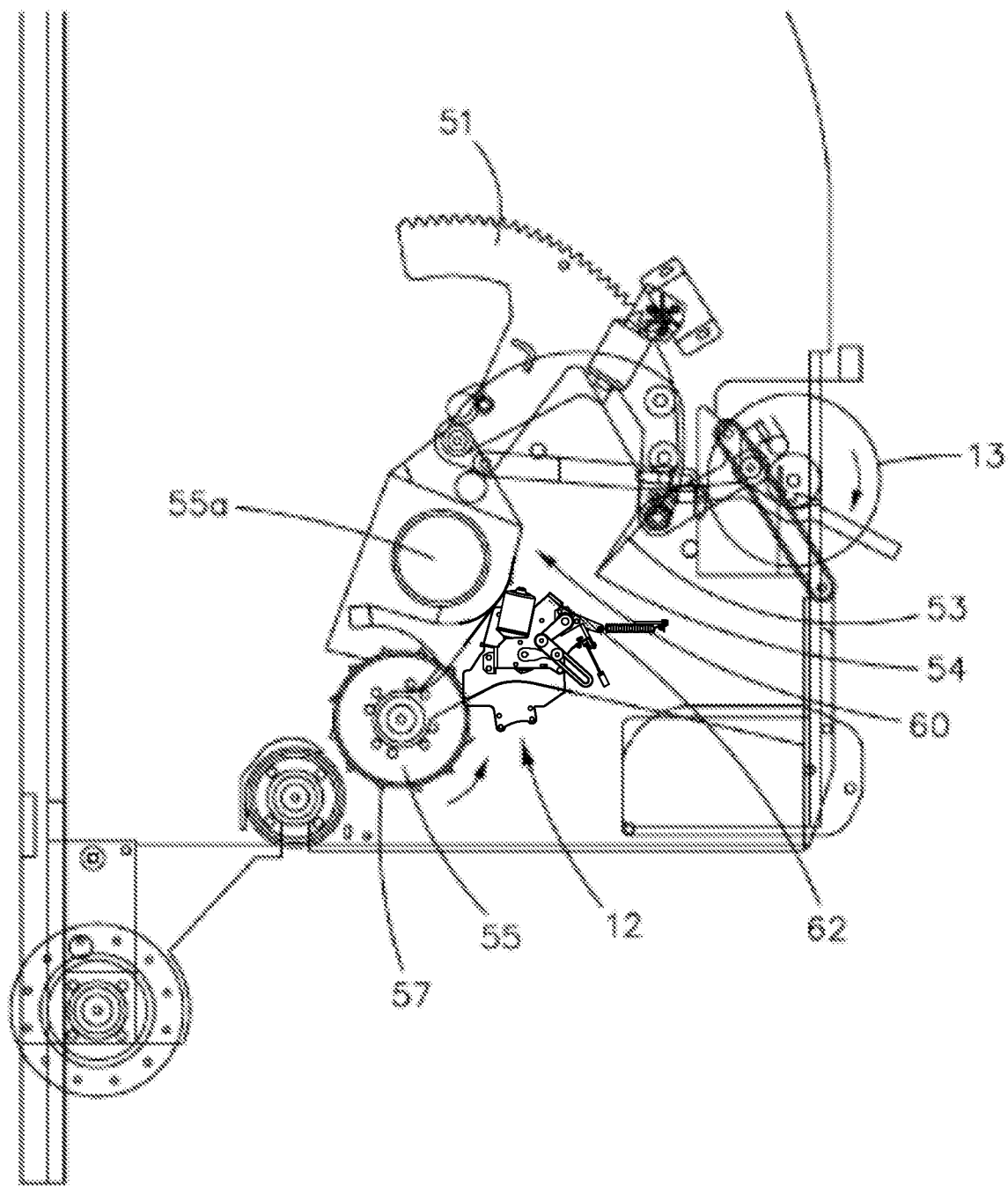
FIG. 4 is a cutaway side view of an exemplary wrapper system and a net knife assembly in a cut position.

FIGS. 2-4 show an exemplary embodiment of the bale wrapping system including net dispensing assembly 11 and net knife assembly 12. As shown, the net dispensing assembly 11 includes a net roll 13, net spreader rolls 50, a duckbill assembly 51, a duckbill motor 52, and duckbill 53. The net cutting assembly includes a net knife assembly 12 positioned below the net dispensing assembly 11. In this arrangement, the knife cuts the net from below. Although the embodiments depicted and described herein relate to embodiments cutting the net from below, it should be noted that a similar knife arrangement could be employed for cutting from above, with the opposite movement, so long as the knife moves in a direction opposing motion of the net. The net knife assembly 12 is described in more detail below and with respect to FIGS. 5-19. Bale chamber rolls 55 facilitate the forming of the bale and wrapping of the bale with the net. Reference numeral 55a is used to denote the location of the axis of a bale chamber roll, which is not shown for clarity.

The net may be fed from the net roll 13, travels over the net spreader rolls 50 and exits at a tip 54 of the duckbill 53. The tip 54 of the duckbill 53 serves to pinch the net and prevents the net from snapping back through the duckbill 53 once it is cut. Generally, a portion of net can extend out of the tip 54 after a net cutting action. For example, a section of net that hangs out of the tip 54 of the duckbill 53 can be where the net grabs on to the bale when the duckbill 53 is inserted for the next bale wrapping cycle.

The duckbill motor 52 may be dedicated to the duckbill 53 and operation of the duckbill motor 52 functions to insert the duckbill 53 to commence a net wrapping cycle and to retract the duckbill 53 at the end of the wrapping cycle once the net has been cut. The net spreader rolls 50 function to define the path of the net as it weaves through the duckbill assembly 53 and to ensure the net is stretched to one side of the bale to the other side of the bale. In the operation of the illustrated net dispensing assembly 11, the net comes off the bottom of the net roll 13, which, in the figure, rotates clockwise, and goes around the upper side of the upper net spreader roll 50. The net then makes a substantially 180-degree turn and goes on the net roll side of the lower net spreader roll 50, and then through the tip 54 of the duck bill 53. The rotational direction of the net roll 13 is unimportant, but will ultimately determine the location where the net leaves the roll, and/or the number and placement of additional rolls needed to direct the net appropriately to the duckbill 53, and eventually rearward, toward the bale chamber. The front of the baler 10 is indicated by arrow 56.

The bale chamber roll 55 closest to the net knife assembly 12 may include ribs 57 disposed about the outside of the roll. A bale chamber roller 55 positioned above this roller (not shown) may also include ribs. A gap or clearance may be formed between these two bale chamber rollers 55 to allow access for the tip 54 of the duckbill 53. As the bale chamber roll 55 rotates, the net pinches between the rolls and the bale and ribs 57 help grabs the net and feed it into the bale chamber and onto the bale. In the illustrated embodiment, the bale may rotate such that the top material moves forward and downward, with respect to the baler 10, clockwise as shown in the figure, in the chamber and the bale chamber rolls 55 rotate in the opposite direction (counterclockwise).

FIG. 2 shows the net dispensing assembly 11 and net knife assembly 12 in the home position. FIG. 3 shows the duckbill 53 in the net start or wrap position and the net knife assembly 12 in an intermediate position (e.g., a position between the home and the cut positions). FIG. 4 shows the net dispensing assembly 11 in the home position and net knife assembly 12 in the cut position.

As shown in FIGS. 2-4, from the home position, the knife carrier 62 of the net knife assembly 12 rotates clockwise and forward with respect to the baler 10 as shown in FIGS. 5-19, and the knife 60 clockwise and forward toward the bale chamber and into the net. The net is traveling rearward toward the bale chamber. As such, the direction of net travel and the direction of knife 60 travel are in opposite directions. As will be discussed in greater detail below, as the knife 60 approaches the cut position, a tensioning member (e.g., a spring) accelerates the knife 60 toward the net to impart sufficient force for a clean cut. The opposite direction of travel of the knife 60 and net assists with tensioning the net and creating clean cut. To return to the home position, the knife carrier 62 and knife 60 are rotated counterclockwise with respect to the baler 10.

A typical bale wrapping cycle and net cutting operation for the embodiment shown in FIGS. 2-4 may operate as follows. In the home position (FIG. 2), the knife carrier 62 of net knife assembly 12 is in the lower or home position and the duckbill 53 of the net dispensing assembly 11 is in the raised or home position. The home position would be typical of the time when a bale is being formed. At some point in time the bale forming operation would be complete and it would be time to wrap the bale. At this time, the duckbill 53 would move to the net start position where the duckbill 53 rotates into the bale chamber as shown in FIG. 3. The duckbill tip 54 fits in between upper and lower bale chamber rolls 55 (the upper roll is not shown for clarity, but its location is marked 55a) and the net is pinched between the bale and the lower roll causing the net to start to feed on to the bale. Sensors (not shown) may be provided to determine when the net is flowing on to the bale.

Once it is determined that the bale is properly wrapped, the duckbill 53 is retracted out of the bale chamber and returns to the duckbill home position (see FIG. 4). Completion of the net wrapping may be determined using sensors and/or via passage of a specified time period. At this point in the bale wrapping cycle, the net is still flowing out of the duckbill 53 to the bale chamber. To cut the net, the knife carrier 62 of net knife assembly 12 is rotated clockwise to the cut position. When the knife carrier 62 reaches the cut position, the knife 60 stops moving and the net is forced or pulled against the knife 60 and the net is cut. In some embodiments, the knife 60 is forced or pulled against the net by the tensioning member, and the net is cut. In an ideal situation, the net is cut as soon as the knife 60 is actuated into the cut position and the net stops being fed. In the cut position, the knife 60 is positioned a distance rearward of the duckbill tip 54 and when the net is cut a net tail remains sticking out of the duckbill 53 (the net tail being essentially the distance between the knife 60 and the tip of the duckbill 53 when the cut is made). After the net is cut, the knife 60 is rotated counterclockwise into the home position until the next cutting sequence.

FIGS. 5-19 show side, perspective and detailed views of the exemplary net knife assembly 12 as actuated step-by-step from the home position to the cut position, and back to the home position. The net knife assembly 12 includes the knife carrier 62 with a knife 60 coupled to the knife carrier 62. The net knife assembly 12 includes an electric motor 64 coupled to a mounting bracket 66. The mounting bracket 66 can be coupled to one or more parts of the frame of the baler 10 to secure the net knife assembly 12 within the baler 10. The net knife assembly 12 includes a stop bracket 68 coupled to the mounting bracket 66. The stop bracket 68 includes inwardly directed first and second stop members 70, 72 separated from each other. The first stop member 70 can be configured to abut the knife carrier 62 during rotation of the net knife assembly 12 to maintain the net knife assembly 12 in the home position, and the second stop member 72 can be configured to abut the knife carrier 62 during rotation of the net knife assembly 12 to maintain the net knife assembly 12 in the cut position.

The net knife assembly 12 includes a linkage drive system for rotating the knife 60 between the home and cut positions. The linkage drive system includes a drive linkage 74 mechanically coupled to the electric motor 64 such that actuation of the electric motor 64 rotates the drive linkage 74 counterclockwise. One end of the drive linkage 74 is rotatably coupled to a shaft 76 of the electric motor 64. The opposing end of the drive linkage 74 is slidably coupled to a slotted linkage 78. The slotted linkage 78 includes an elongated slot 80 within which one end of the drive linkage 74 can travel. One end of the slotted linkage 78 is rotatably coupled to a bearing linkage 82. The bearing linkage 82 is rotatably coupled at one end to the slotted linkage 78 and coupled to a bearing 84 at an opposing end. The bearing 84 includes a pivot shaft 86 defining an axis at which the knife carrier 62 pivots. The net knife assembly 12 includes a bearing 88 at an opposing end of the knife carrier 62 with a pivot shaft 90 aligned along the same axis of rotation as the pivot shaft 86.

The electric motor 64 drives counterclockwise rotation of the drive linkage 74 which, in turn, slides along the slot 80 and rotates the slotted linkage 78. Rotation of the slotted linkage 78 rotates the bearing linkage 82 which, in turn, rotates the knife carrier 62 and knife 60. The net knife assembly 12 includes a spring attachment linkage 92 (e.g., a substantially L-shaped linkage) coupled to the knife carrier 62 such that rotation of the knife carrier 62 rotates the spring attachment linkage 92. The net knife assembly 12 includes a tensioning member 94 (e.g., a spring) coupled to one end of the spring attachment linkage 92 and coupled at an opposing end to an anchor 96. The anchor 96 can be coupled to the frame of the baler 10.

As the knife carrier 62 is rotated over center of the tensioning member 94, the tensioning member 94 accelerates the knife carrier 62 into the home position or the cut position, thereby reducing the amount of power needed from the electric motor 64 to drive the knife carrier 62 into the home or cut positions. In some embodiments, the net knife assembly 12 can include one or more sensors 98 configured to detect when the knife carrier 62 has been positioned in the home and/or cut positions. For example, the sensors 98 can be mounted at the stop members 70, 72 and detect force imparted by the knife carrier 62 when the tensioning member 94 accelerates the knife carrier 62 into the home and/or cut positions. The baler 10 can include one or more processing devices (not shown) configured to detect signals from the sensors 98 and actuate the electric motor 64 based on the received signals, signals received from an operation interface receiving input from a user, combinations thereof, or the like.

Figure 5:
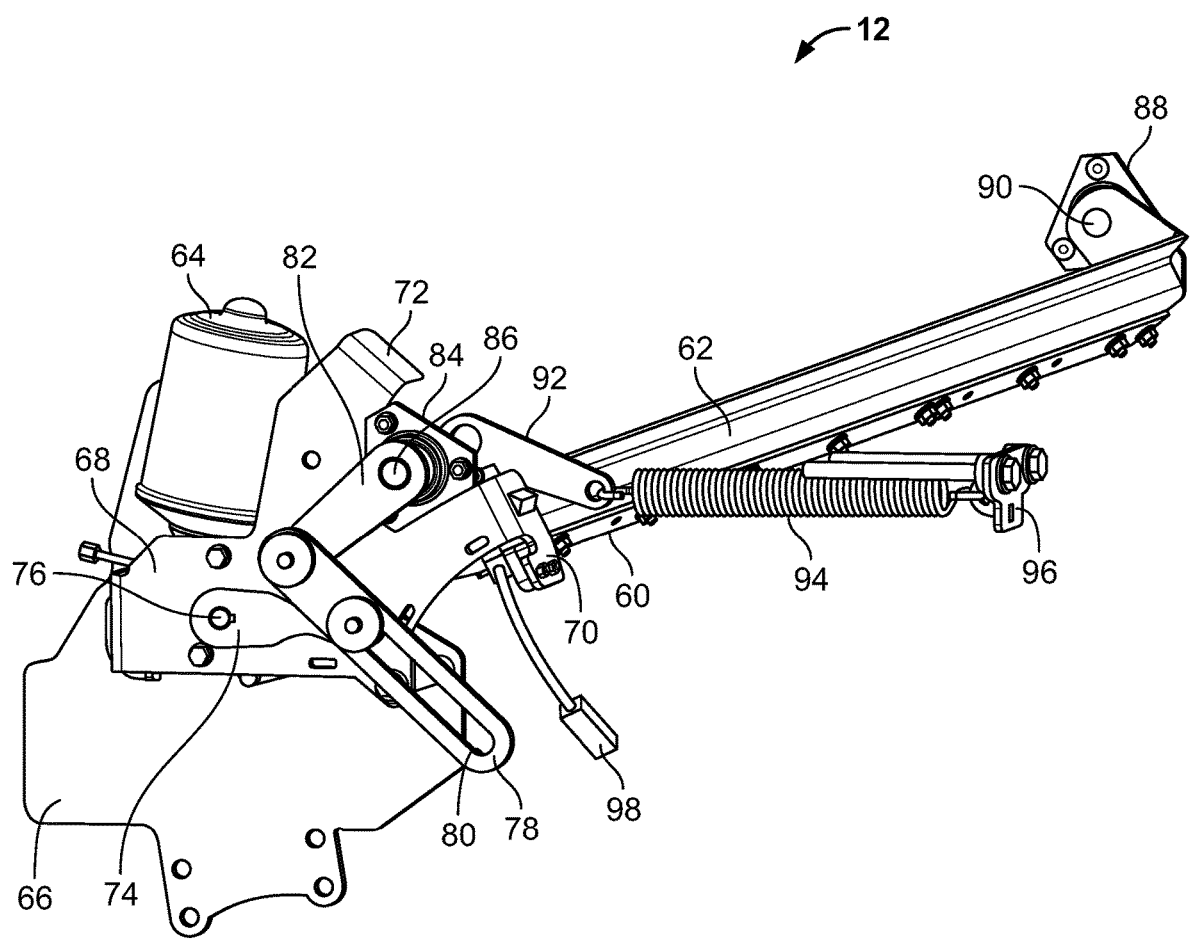
FIG. 5 is a perspective view of an exemplary net knife assembly in a home position.
Figure 6:
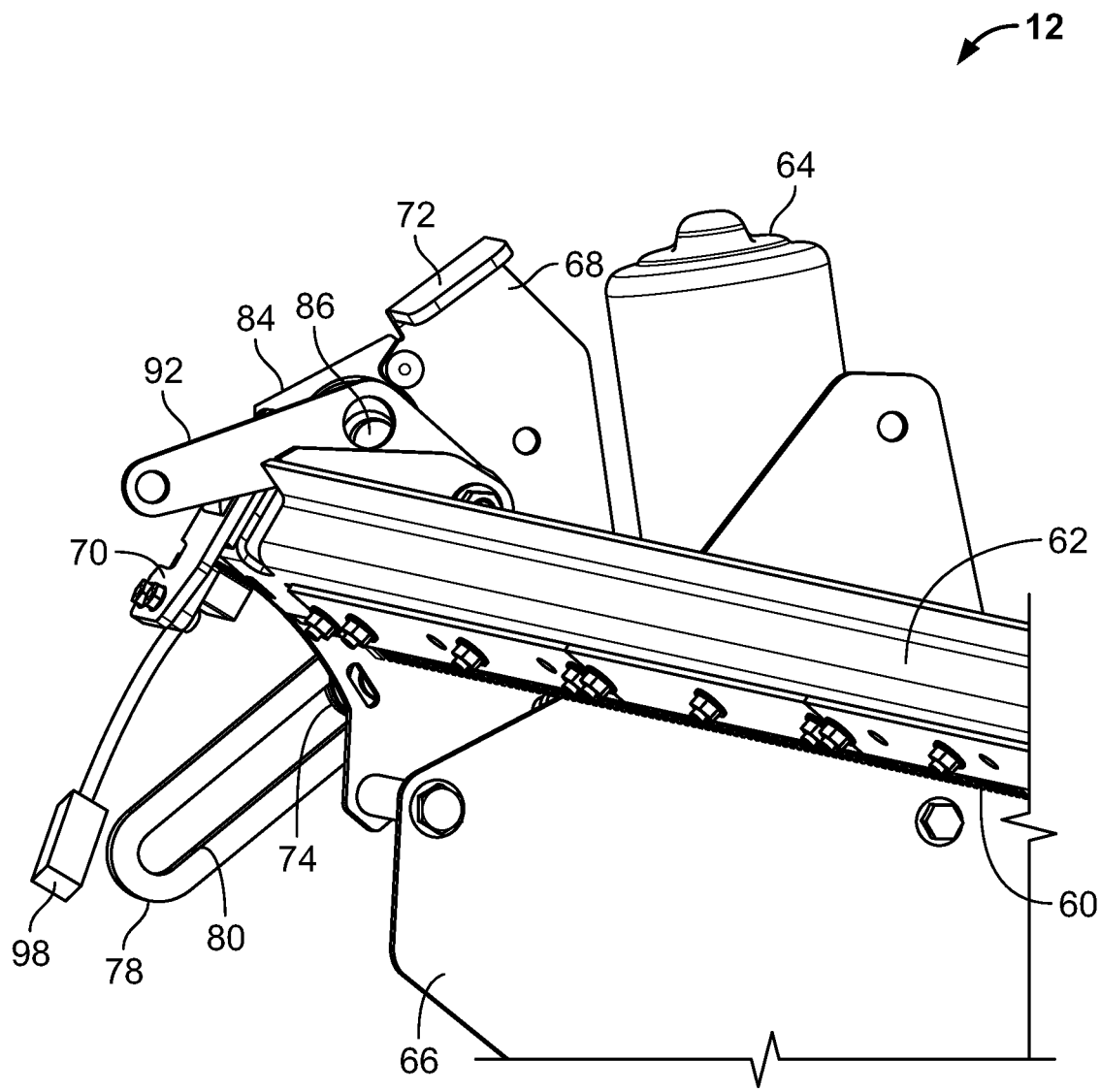
FIG. 6 is a detailed, perspective view of an exemplary net knife assembly in a home position.
Figure 7:
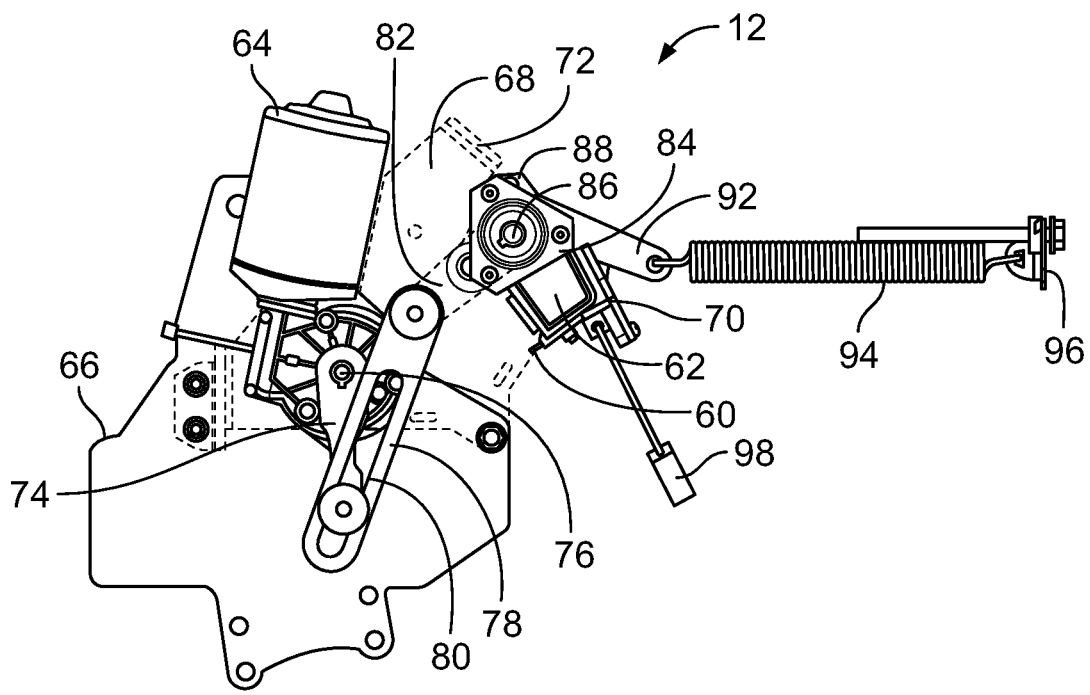
FIG. 7 is a side view of an exemplary net knife assembly in a home position.

FIGS. 5-7 show perspective, detailed and side views of the net knife assembly 12 in the home position. In particular, the knife carrier 62 is secured or held against the stop member 70 by the force of the tensioning member 94, thereby preventing undesired exposure of the knife 60. The stop member 70 prevents the knife carrier 62 from rotating counterclockwise. The knife 60 remains pointed downwardly and inwardly in the home position. The endpoint of the linkage 74 can be at or near the distal end of the slot 80 of the linkage 78.

Figure 8:
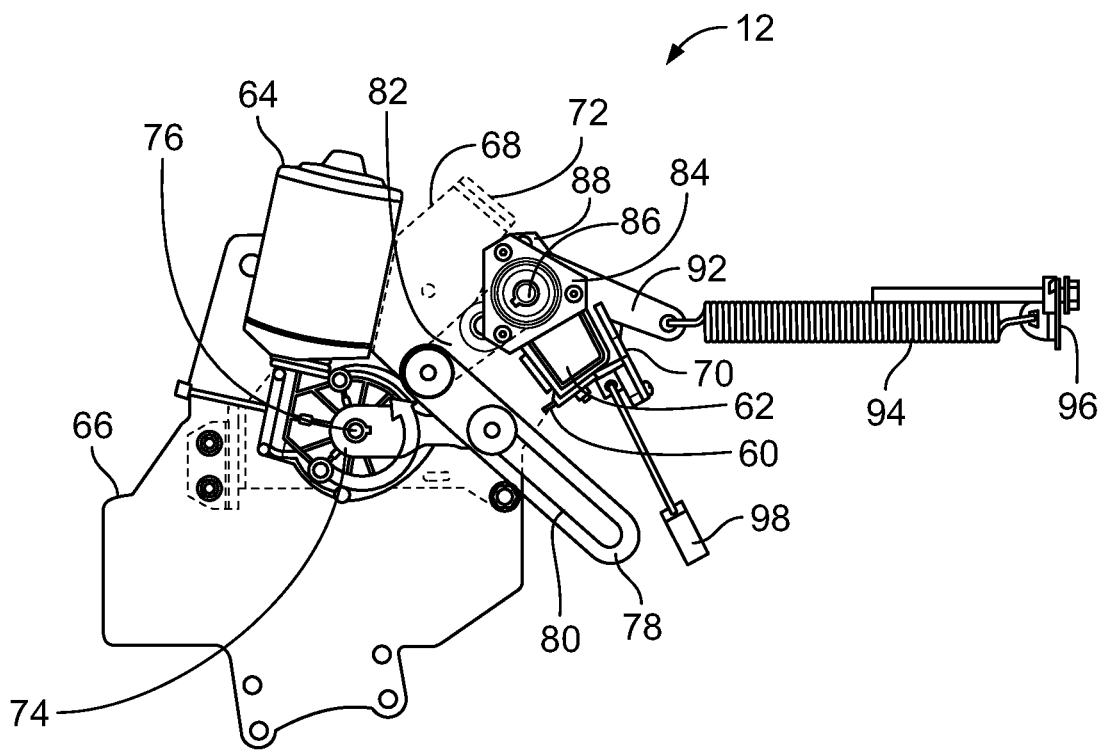
FIG. 8 is a side view of an exemplary net knife assembly in a home position and a partially rotated drive linkage.

FIG. 8 shows a side view of the net knife assembly 12 in a home position with the drive linkage 74 partially rotated counterclockwise. To commence the net cutting procedure, the electric motor 64 is actuated to rotate the drive linkage 74 counterclockwise. Counterclockwise rotation of the drive linkage 74 slides the endpoint of the linkage 74 to the proximal end of the slot 80 of the linkage 78. The linkage 78 pivots at the joint with the linkage 82 without rotating the linkage 82. Therefore, only the linkages 74, 78 pivot and the knife carrier 62 is not rotated from the home position.

Figure 9:
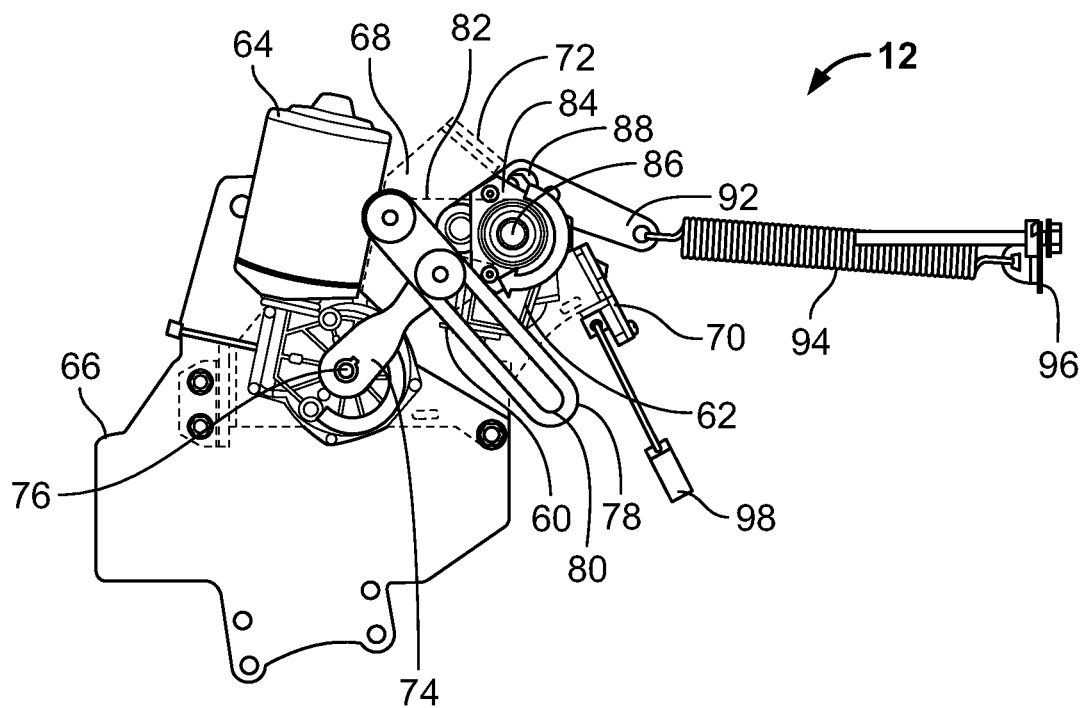
FIG. 9 is a side view of an exemplary net knife assembly between a home position and a cut position, including a partially rotated drive linkage.

FIG. 9 shows a side view of the net knife assembly 12 in an intermediate position between the home and cut positions. As the electric motor 64 continues to rotate the drive linkage 74 counterclockwise and the endpoint of the linkage 74 is forced against the proximal end of the slot 80 of the linkage 78, the linkage 78 imparts a rotational force on the linkage 82 to rotate the linkage 82 clockwise. Rotation of the linkage 82 clockwise results in clockwise rotation of the bearing 84 and knife carrier 62. Clockwise rotation of the knife carrier 62 results in counterclockwise or upward rotation of the linkage 92, which gradually increases the tension in the tensioning member 94.

Figure 10:
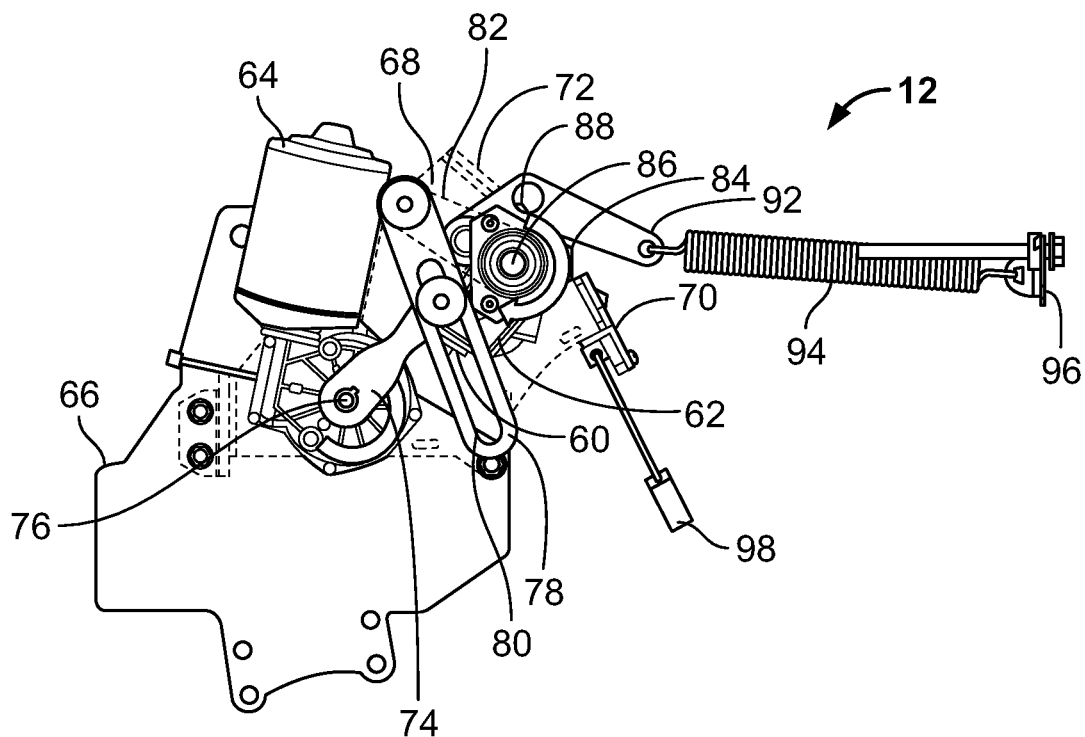
FIG. 10 is a side view of an exemplary net knife assembly rotated through an over center position.
Figure 19:
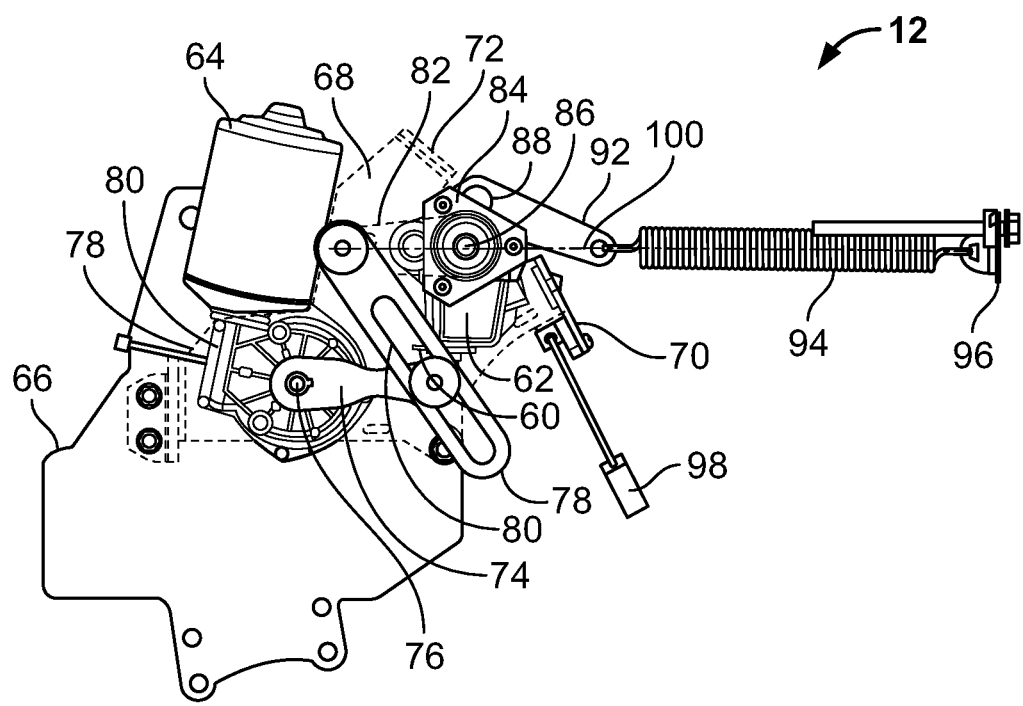
FIG. 19 is a side view of an exemplary net knife assembly in an over center position.

FIG. 10 shows a side view of the net knife assembly 12 in an intermediate position between the home and cut positions. In particular, the knife carrier 62 has been rotated through an over center position of the tensioning member 94. With reference to FIG. 19, when the linkage 92 attachment or coupling point with the knife carrier 62, the knife carrier 62 pivot point (e.g., pivot shaft 86), and the anchor 96 are aligned along a plane 100, the tensioning member 94 exerts substantially zero torque on the knife carrier 62. Such position is referred to herein as the center position of the tensioning member 94. Rotating the knife carrier 62 up to the point of the plane 100 can be referred to herein as an arming operation. If the knife carrier 62 is rotated above the plane 100, the tensioning member 94 accelerates rotation of the knife carrier 62 towards the cut position. If the knife carrier 62 is rotated below the plane 100, the tensioning member 94 accelerates rotation of the knife carrier 62 towards the home position. With reference again to FIG. 10, continued clockwise rotation of the linkage 82 rotates the knife carrier 62 above the plane 100 (e.g., over center of the tensioning member 94). The energy stored in the tensioning member 94 accelerates the knife cutter 62 into the cut position. Such acceleration reduces the amount of power needed from the electric motor 64 to position the knife cutter 62 in the cut position, and ensures a strong force of the knife 60 against the net for a clean cut.

Figure 11:
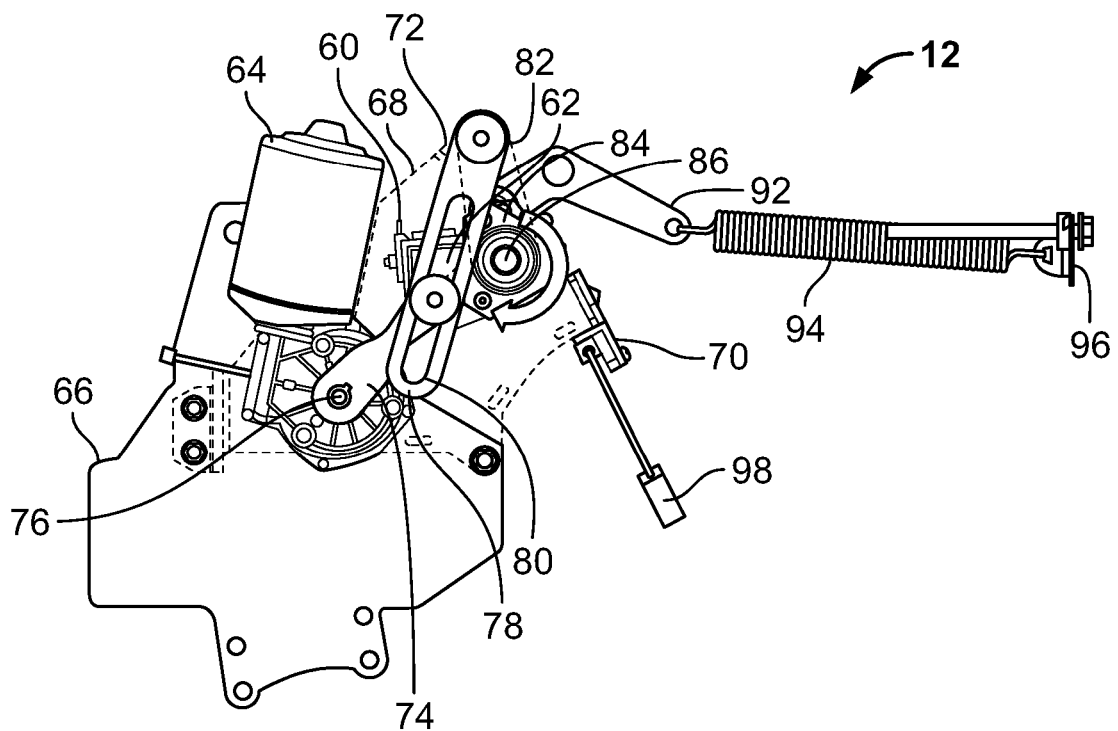
FIG. 11 is a side view of an exemplary net knife assembly partially rotated into a cut position.

FIG. 11 shows a side view of the net knife assembly 12 partially rotated into the cut position. At this point, rather than using power from the electric motor 64, only the energy stored in the tensioning member 94 is used to accelerate the knife carrier 62 into the cut position. In particular, rather than relying on additional energy from the electric motor 64 to swing the knife carrier 62 into the path of the net, the tensioning member 94 provides the driving force for rotating the knife carrier 62 against the net. There is no movement in the electric motor 62 and energy is thereby conserved during the last steps of positioning the knife carrier 62 into the cut position.

Figure 12:
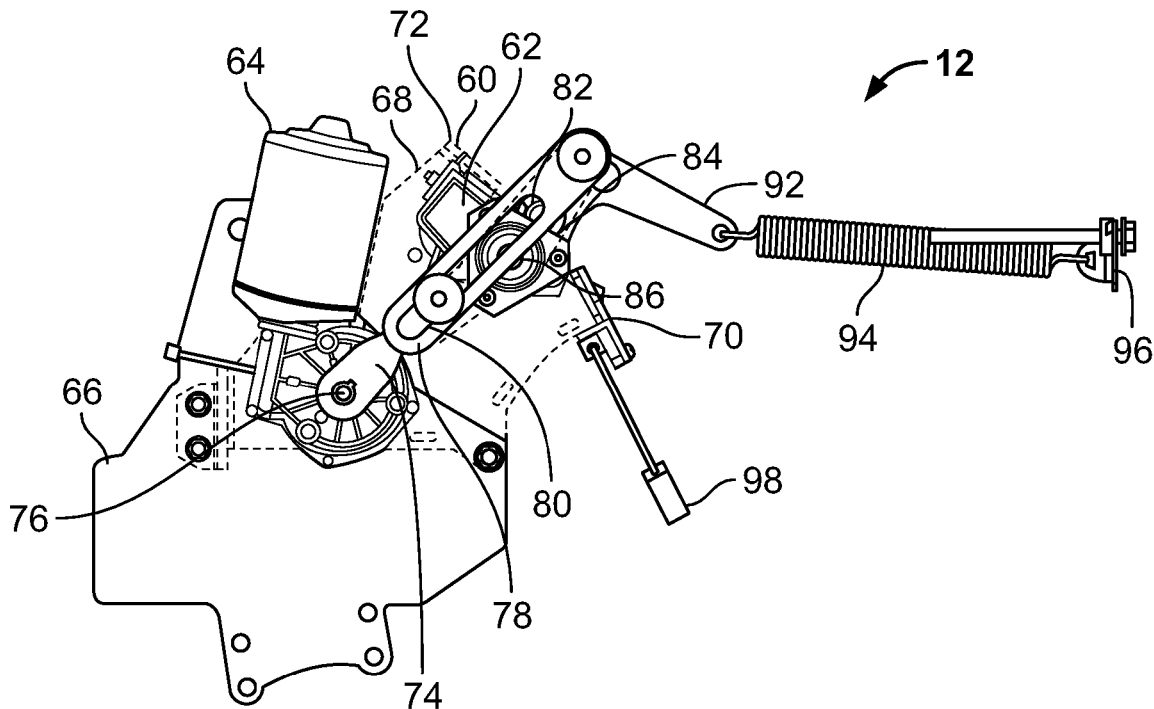
FIG. 12 is a side view of an exemplary net knife assembly in a cut position.
Figure 13:
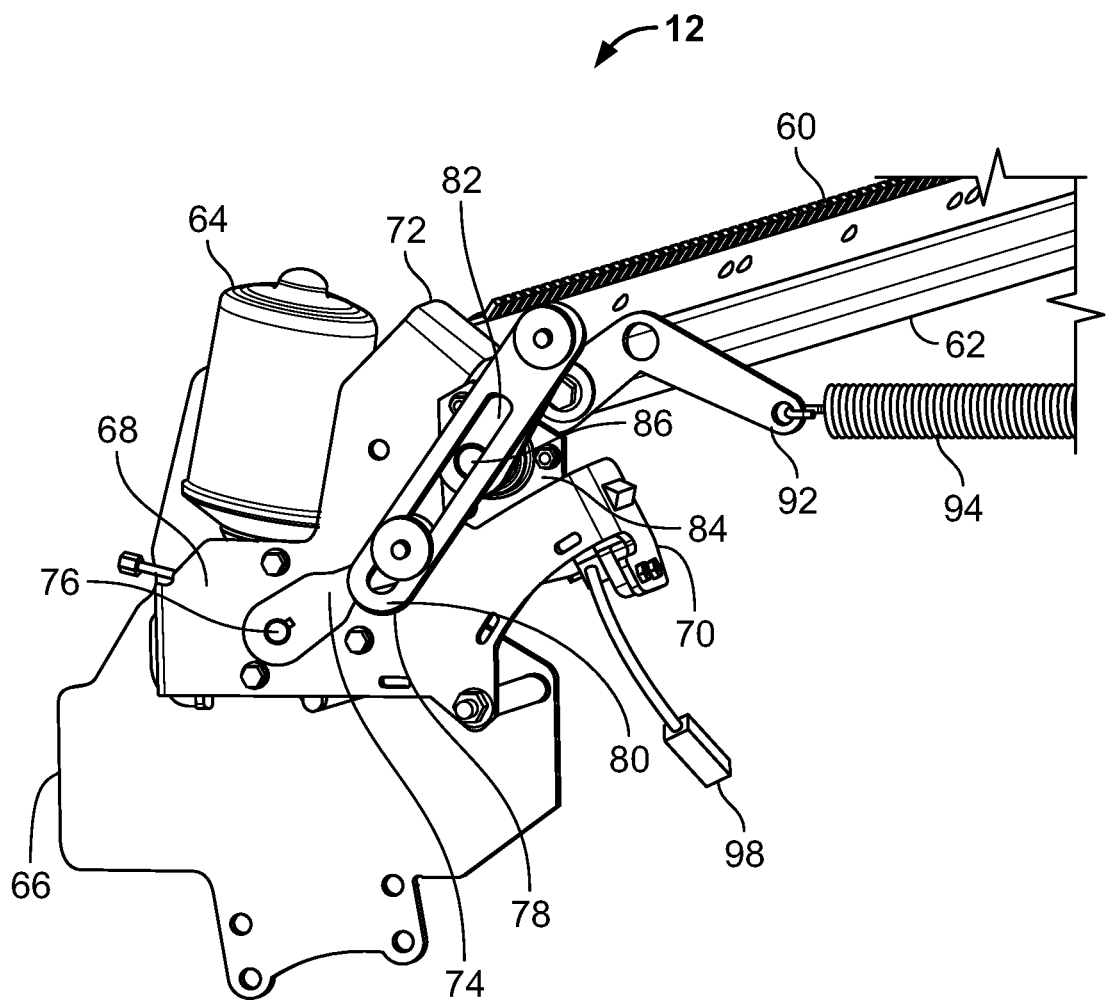
FIG. 13 is a perspective view of an exemplary net knife assembly in a cut position.
Figure 14:
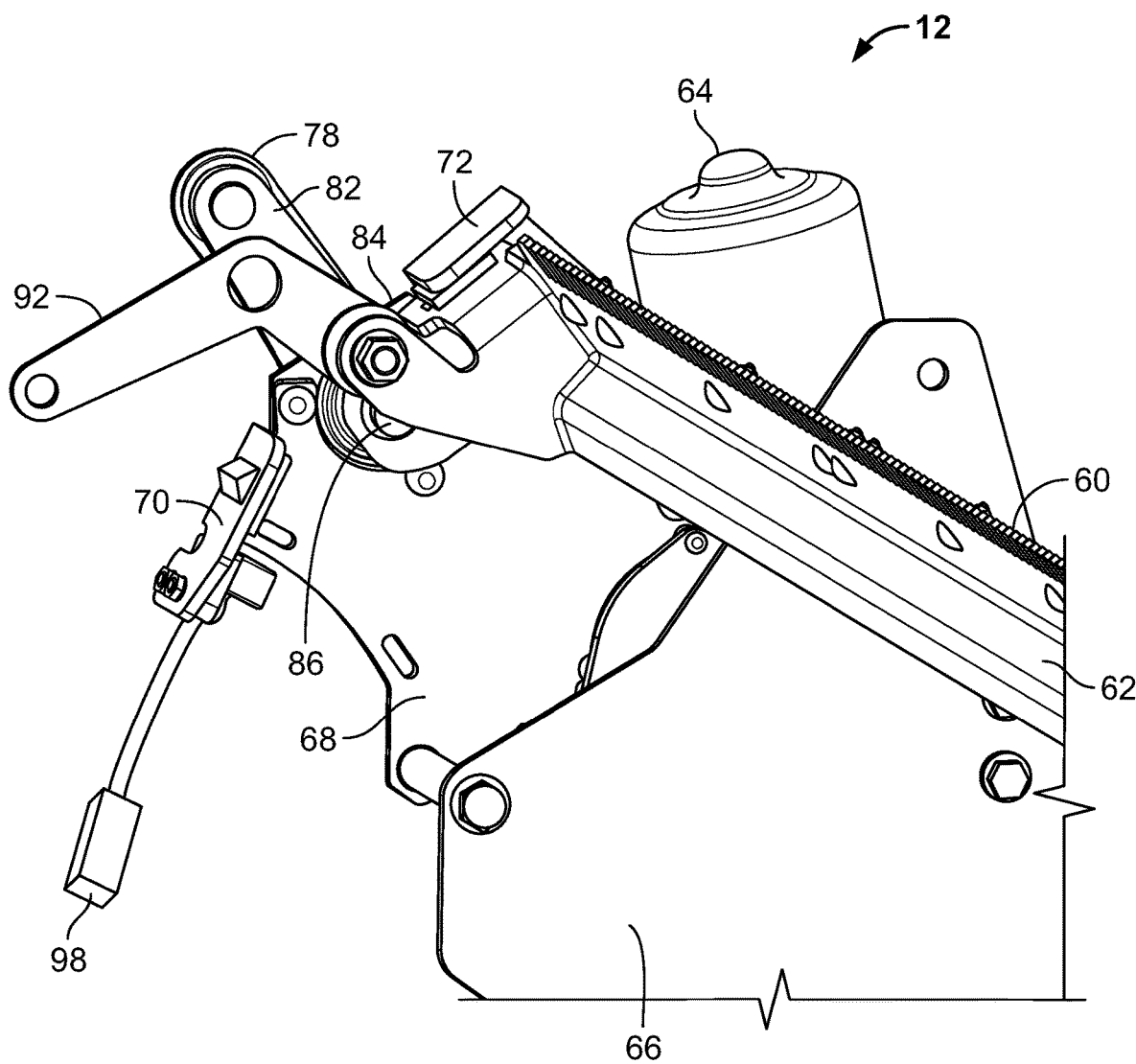
FIG. 14 is a detailed, perspective view of an exemplary net knife assembly in a cut position.

FIGS. 12-14 show perspective, detailed and side views of the net knife assembly 12 disposed in the cut position. There is no movement in the electric motor 62 and the tensioning member 94 forces the knife carrier 62 against the stop member 72. The stop member 72 prevents further clockwise rotation of the knife carrier 62, ensuring the position of the knife carrier 62 for the net cutting procedure. The knife 60 extends a distance over the plane defined by the stop member 72 to allow the net to be cut, while preventing significant exposure of the serrated edge.

Figure 15:
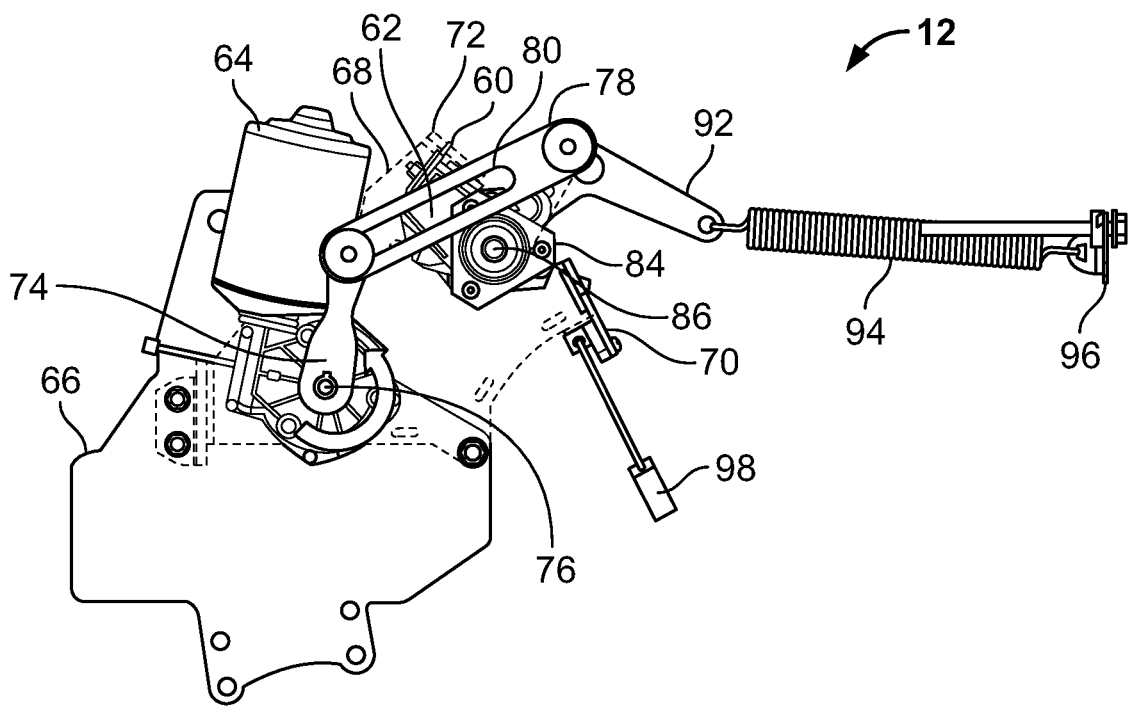
FIG. 15 is a side view of an exemplary net knife assembly in a cut position and a partially rotated drive linkage.

FIG. 15 shows a side view of the net knife assembly 12 in the cut position with the electric motor 64 beginning to rotate counterclockwise to reposition the knife cutter 62 in the home position after the net cutting procedure is complete. The drive linkage 74 slides to the distal end of the slot 80. As the drive linkage 74 is rotated counterclockwise (e.g., completing the initial counterclockwise rotation), the linkage 78 rotates the linkage 82 which, in turn, rotates the knife carrier 62 counterclockwise away from the cut position. Counterclockwise rotation of the knife carrier 62 increases the energy stored in the tensioning member 94.

Figure 16:
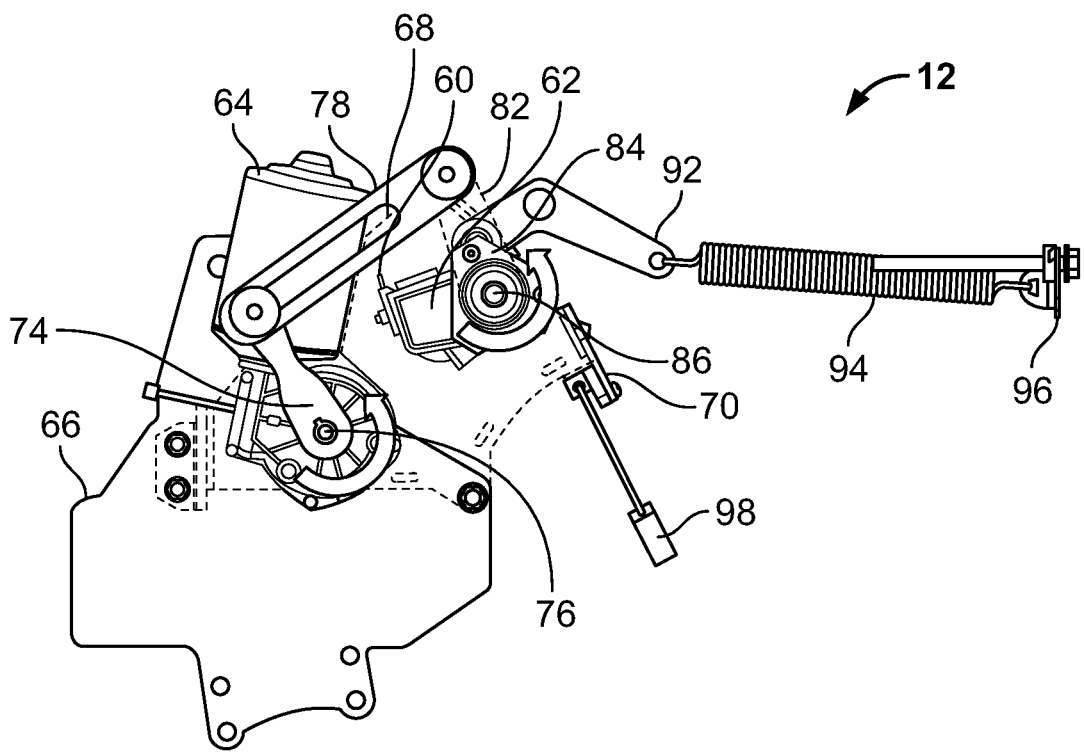
FIG. 16 is a side view of an exemplary net knife assembly partially rotated into a home position.
Figure 17:
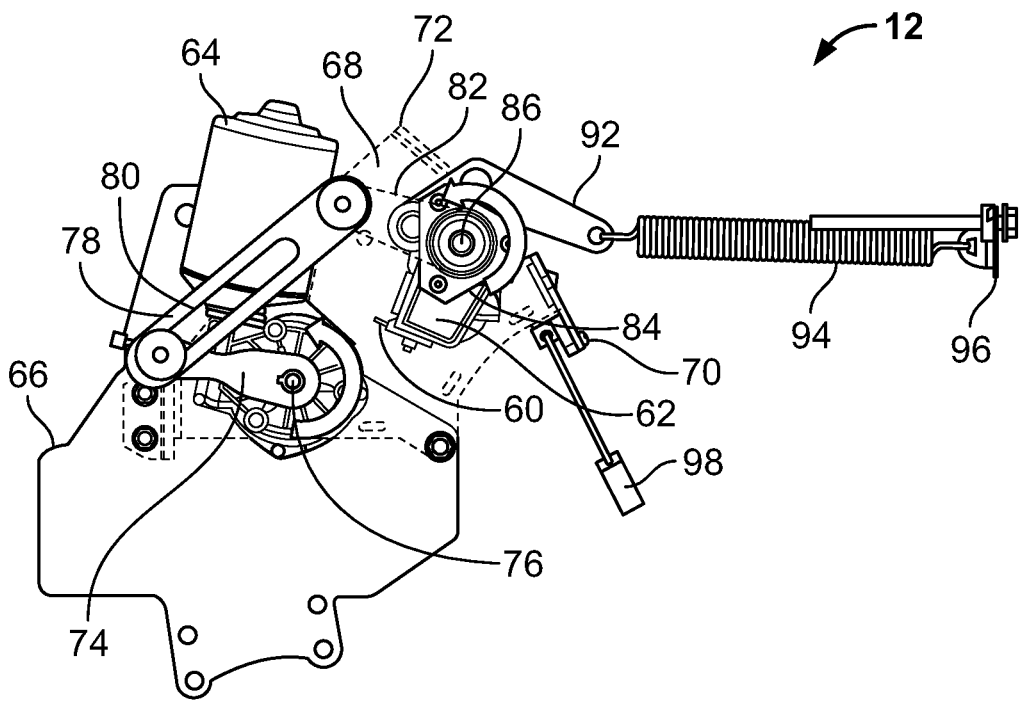
FIG. 17 is a side view of an exemplary net knife assembly partially rotated into a home position.

FIGS. 16 and 17 show side views of the net knife assembly 12 partially rotated from the cut position into the home position. The electric motor 64 continues to rotate the drive linkage 74 counterclockwise, resulting in further counterclockwise rotation of the knife carrier 62. As the knife carrier 62 is rotated counterclockwise, the energy stored in the tensioning member 94 increases.

Figure 18:
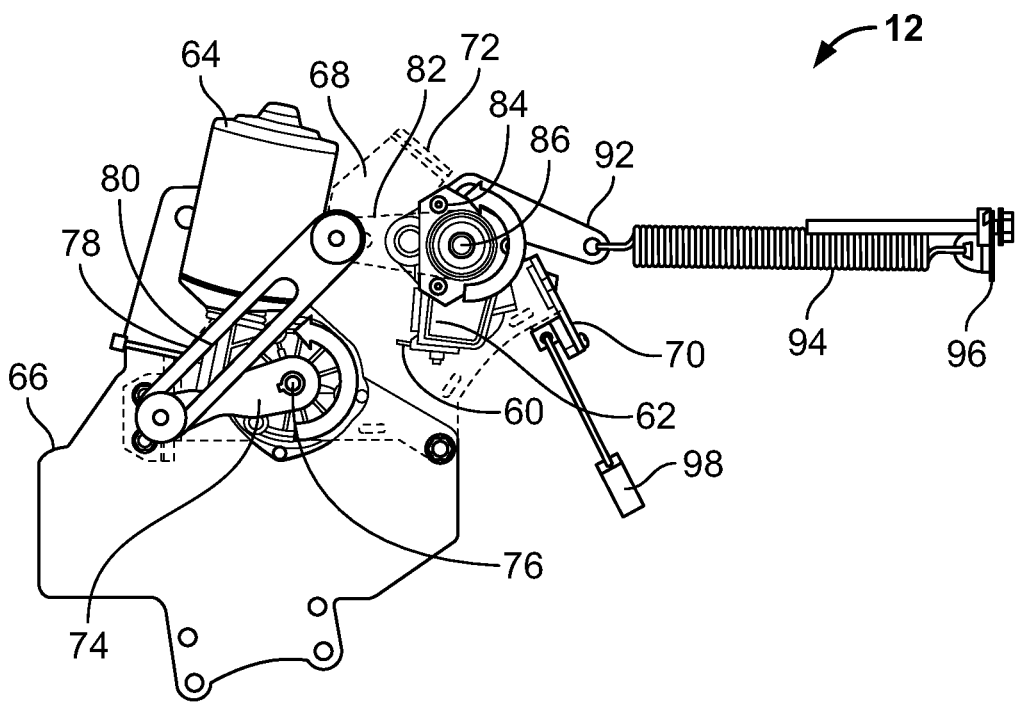
FIG. 18 is a side view of an exemplary net knife assembly rotated through an over center position.

FIG. 18 shows a side view of the net knife assembly 12 rotated through the over center position (e.g., below plane 100). Upon rotating below the plane 100, the energy stored in the tensioning member 94 accelerates the knife carrier 62 into the home position against the stop member 70 (e.g., the position shown in FIG. 7). The energy in the tensioning member 94 maintains the knife carrier 62 in the home position, ensuring safe operation of the net knife assembly 12. Thus, a single counterclockwise rotation of the drive linkage 74 moves the knife carrier 62 from the home position to the cut position, and back to the home position. The tensioning member 94 provides acceleration to the rotation of the knife carrier 62, reducing the overall energy requirements from the electric motor 64 and ensuring that sufficient force is applied to the net to create a clean cut.

While exemplary embodiments have been described herein, it is expressly noted that these embodiments should not be construed as limiting, but rather that additions and modifications to what is expressly described herein also are included within the scope of the present disclosure. Moreover, it is to be understood that the features of the various embodiments described herein are not mutually exclusive and can exist in various combinations and permutations, even if such combinations or permutations are not made express herein, without departing from the spirit and scope of the present disclosure.

The invention claimed is:

1. A net knife assembly for a baler, comprising:
a linkage drive system comprising a drive linkage coupled to a motor;
a knife carrier coupled to the linkage drive system and configured to be positioned in a home position and a cut position; and
a tensioning member coupled to the linkage drive system, wherein the motor is configured to rotate the drive linkage of the linkage drive system, rotation of the drive linkage rotating the knife carrier between the home position and the cut position;
wherein upon rotation of the knife carrier through a center position relative to the tensioning member, the tensioning member accelerates rotation of the knife carrier into the home position or the cut position; and
wherein the linkage drive system comprises a slotted linkage having an elongate slot, a bearing linkage which rotates the knife carrier, and an attachment linkage; and
wherein the slotted linkage connects the drive linkage to the bearing linkage, the drive linkage is slidably coupled to the elongate slot of the slotted linkage such that a connection portion of the drive linkage can travel within a length of the slot altering a connection point between the drive linkage and slotted linkage;
wherein rotation of the knife carrier above the center position accelerates rotation of the knife carrier with the tensioning member into the cut position and rotation of the knife carrier below the center position accelerates rotation of the knife carrier with the tensioning member into the home position.

2. The net knife assembly of claim 1, wherein the motor is an electric motor.

3. The net knife assembly of claim 1, wherein the bearing linkage is rotatably coupled to the slotted linkage.

4. The net knife assembly of claim 1, wherein the attachment linkage is coupled to the knife carrier at a coupling point at one end and coupled to the tensioning member at an opposing end.

5. The net knife assembly of claim 4, wherein the center position comprises alignment of the coupling point between the attachment linkage and the knife carrier, a pivot point of the knife carrier, and an anchor of the tensioning member, along a plane.

6. The net knife assembly of claim 1, wherein rotation of the knife carrier below the center position accelerates rotation of the knife carrier with the tensioning member into the home position.

7. The net knife assembly of claim 1, wherein one full rotation of the drive linkage in a single direction rotates the knife carrier from the home position to the cut position, and from the cut position to the home position.

8. The net knife assembly of claim 1, wherein the tensioning member accelerates rotation of the knife carrier into the home position or the cut position without assistance from the motor.

9. The net knife assembly of claim 1, comprising a knife coupled to the knife carrier.

10. A net wrapping system for a baler, comprising:
a net dispensing assembly, comprising:
a supply roll holding a net material;

wrapping material grip for receiving the net material from the supply roll and feeding the net material into a bale chamber along a first direction of travel; and a net knife assembly, comprising:
a linkage drive system comprising a drive linkage coupled to a motor;
a knife carrier coupled to the linkage drive system and configured to be positioned in a home position and a cut position; and
a tensioning member coupled to the linkage drive system,
an attachment linkage coupled to the knife carrier at a coupling point at one end and coupled to the tensioning member at an opposing end;
wherein the motor is configured to rotate the drive linkage of the linkage drive system, rotation of the drive linkage rotating the knife carrier between the home position and the cut position;
wherein upon rotation of the knife carrier through a center position relative to the tensioning member, the tensioning member accelerates rotation of the knife carrier into the home position or the cut position depending on a position of the knife carrier with respect to a plane, wherein the center position comprises alignment of the coupling point between the attachment linkage and the knife carrier, a pivot point of the knife carrier, and an anchor of the tensioning member, along the plane;
wherein if the knife carrier is rotated above the plane, the tensioning member accelerates rotation of the knife carrier towards the cut position and if the knife carrier is rotated below the plane the tensioning member accelerates rotation of the knife carrier towards the home position.

11. The net wrapping system of claim 10, wherein rotation of the knife carrier into the cut position is in a second direction of travel, the second direction of travel being opposite from the first direction of travel.

12. The net wrapping system of claim 10, wherein the supply roll comprises a cylindrical body extending transversely across the baler.

13. A baler, comprising:
a frame;
an apron assembly disposed within the frame and configured to form a bale; and
a net wrapping system, the net wrapping system comprising:
(i) a net dispensing assembly, comprising:
a supply roll holding a net material;
a net wrap guide for receiving the net material from the supply roll and feeding the net material into a bale chamber along a first direction of travel; and
(ii) a net knife assembly, comprising:
a linkage drive system comprising a drive linkage coupled to a motor;
a knife carrier coupled to the linkage drive system and configured to be positioned in a home position and a cut position; and
a tensioning member coupled to the linkage drive system,
wherein the motor is configured to rotate the drive linkage of the linkage drive system, rotation of the drive linkage rotating the knife carrier between the home position and the cut position;
wherein upon rotation of the knife carrier through a center position relative to the tensioning member, the tensioning member accelerates rotation of the knife carrier into the home position or the cut position; and
wherein the linkage drive system comprises a slotted linkage having an elongate slot, a bearing linkage configured to rotate the knife carrier, and an attachment linkage; and
the bearing linkage is rotatably coupled to the slotted linkage at a bearing linkage coupling point;
the slotted linkage connects the drive linkage to the bearing linkage, the drive linkage is slidably coupled to the elongate slot of the slotted linkage such that a connection portion of the drive linkage can travel within a length of the slot between a first position and a second position changing a distance between the connection portion and the bearing linkage coupling point as the net drive assembly is actuated by the motor;
and
the attachment linkage is coupled to the knife carrier at a coupling point at one end and coupled to the tensioning member at an opposing end;
wherein the tensioning member accelerates rotation of the knife carrier into the home position or the cut position depending on a position of the knife carrier with respect to a plane, wherein the center position comprises alignment of the coupling point between the attachment linkage and the knife carrier, a pivot point of the knife carrier, and an anchor of the tensioning member, along the plane;
wherein if the knife carrier is rotated on a first side of the plane, the tensioning member accelerates rotation of the knife carrier towards the cut position and if the knife carrier is rotated on an opposing side of the plane the tensioning member accelerates rotation of the knife carrier towards the home position.

* * * * *